US005710615A

United States Patent [19]
Kitani

[11] Patent Number: 5,710,615
[45] Date of Patent: Jan. 20, 1998

[54] PROGRESSIVE POWER MULTIFOCAL LENS

[75] Inventor: Akira Kitani, Tokyo, Japan

[73] Assignee: Hoya Corporation, Tokyo, Japan

[21] Appl. No.: 633,073

[22] Filed: Apr. 16, 1996

[30] Foreign Application Priority Data

Apr. 18, 1995 [JP] Japan ................................ 7-092523

[51] Int. Cl.$^6$ ................................................ G02C 7/06
[52] U.S. Cl. ................................................ 351/169
[58] Field of Search ........................... 351/168, 169, 351/170, 171, 172

[56] References Cited

FOREIGN PATENT DOCUMENTS

| A-62-10617 | 1/1987 | Japan. |
| A-6-214199 | 8/1994 | Japan. |
| A-2-273 369 | 6/1994 | United Kingdom. |

Primary Examiner—Scott J. Sugarman
Attorney, Agent, or Firm—Oliff & Berridge PLC

[57] ABSTRACT

A progressive power multifocal lens designed by attaching importance to an intermediate vision and a near vision in such a manner as to ensure broad intermediate vision viewing portion and near vision viewing portion and to have a well-balanced viewing zone among the distance, near and middle portions, whereby a resultant image of an object is little varied or fluctuated, especially, in lateral directions.

5 Claims, 5 Drawing Sheets

F I G. 1
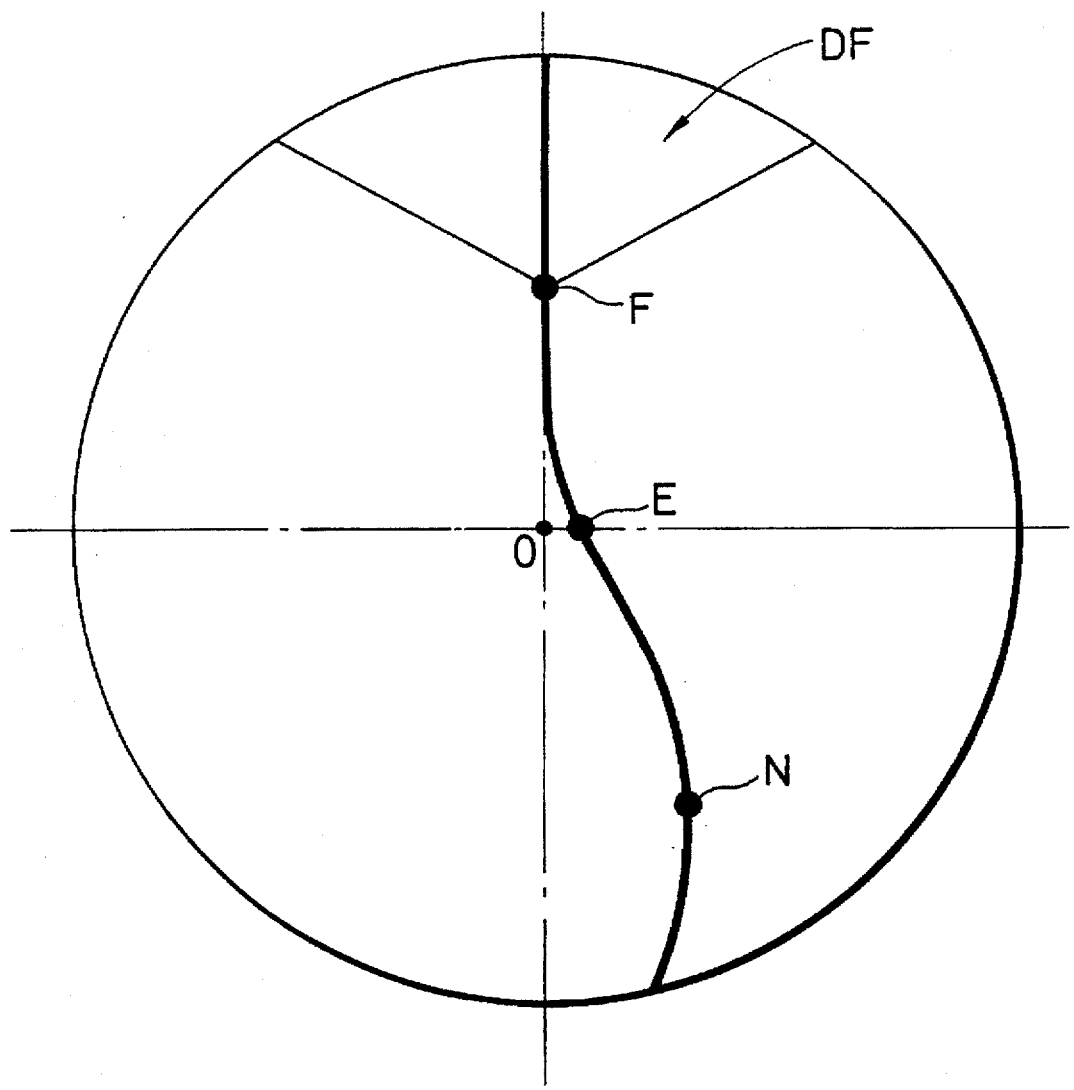

Add(Di) = 2.00 D

K = 2.5

Add(Di) = 2.00 D

PROGRESSIVE POWER MULTIFOCAL LENS

BACKGROUND OF THE INVENTION

1. Field of The Invention

This invention relates to a progressive power multifocal lens (namely, a progressive power lens or a progressive multifocal lens) having a viewing function or capability, which excels in intermediate vision viewing and in near vision viewing.

2. Description of The Related Art

Generally, in a progressive power multifocal lens, there are a zone designated as "a far (or distance) vision viewing portion" (hereunder sometimes referred to simply as a distance portion) for viewing long-distance places, another zone designated as "an intermediate vision viewing portion" (hereunder sometimes referred to simply as a middle portion) for viewing middle-distance places and still another zone designated as "a near vision viewing portion" (hereunder sometimes referred to simply as a rerading (or near) portion) for viewing short-distance places. Incidentally, the term "middle-distance" referred hereinabove designates distance ranging from 50 centimeters (cm) to 2 meters (m) approximately. Further, the term "long-distance" designates (namely, means) distance longer than the middle-distance. Moreover, the term "short-distance" designates distance shorter than the middle-distance. The term "long-distance", however, designates only infinite distance in some cases. Furthermore, sometimes, the term "short-distance" designates distance ranging from 30 cm to 33 cm. Thus, as matters stand, there is no definite definitions of these terms. Originally, there are no apparently clear boundaries among these zones on a progressive power multifocal lens. Therefore, even though these terms are not defined definitely, there is no inconvenience in actually wearing progressive power multifocal lenses.

However, when designing, manufacturing, inspecting and further putting a lens into a rim or frame, some reference points, which are precisely defined on the lens, become necessary. Among such points, presently most common points are the following three points: a far vision power measuring position (namely, a position for measuring the (refractive) power of a lens in the case of a far vision) F; a near vision power measuring, position (namely, a position for measuring the (refractive) power thereof in the case of a near vision) N: and a position (hereunder referred to as an eye-point position, which includes what is called a fitting point, in the present specification) E through which a visual line (namely, a line of sight) of a wearer (namely, a person wearing the lens) passes when his eyes are in a frontal vision condition (namely, in a front viewing condition). Usually, when a lens is in an unprocessed state, these points are indicated on a surface of the lens as optical layout information concerning the lens.

The determination of the far vision power measuring position F and the near vision power measuring position N of a lens is unavoidable for checking whether or not the lens is within specifications determined according to ISO (International Standards Organization) standards, JIS (Japanese Industrial Standards) or the like. Further, the eye-point position E is sometimes used for determining the vertical or horizontal direction when a lens is put into a rim or frame. Alternatively, in some cases, the eye-point position E of a lens is used in such a way as to coincide with the geometric central point G thereof.

Additionally, for example, a position Q for measuring the (prism) refractive power of a lens is necessary for obtaining optical information concerning the lens.

Further, the starting point and the end point of a progressive change in the refractive power of a lens are positions representing important lens information. It is, however, not mandatory to indicate the starting point and the end point on the surface of the lens. Moreover, it is usually difficult to specify the locations of these points through actual measurement thereof.

Furthermore, it is often that the far vision power measuring position F and the near vision power measuring position N of a lens are shifted upwardly and downwardly from the starting point and the end point of progressive change in the refractive power thereof by a distance (usually, 2 to 4 mm or so), which corresponds to the radius of an aperture portion of a lensmeter (or lensometer), respectively.

Meanwhile, the presence of astigmatism can be cited as an unavoidable defect of a progressive power multifocal lens. The cause of this astigmatism is the presence of an "addition" (namely, an additional positive refractive power (hereunder sometimes abbreviated as Di)), which is defined as the difference in surface refractive power between the far vision power measuring position F and the near vision power measuring position N. More particularly, the torsion (or distortion) of a curved surface, which is caused owing to a change in curvature of a lens surface between the far vision power measuring position F and the near vision power measuring position N, brings about the astigmatism. Therefore, reduction in the value of the "addition", or increase in the distance between the far vision power measuring position F and the near vision power measuring position N (strictly speaking, reduction in the rate of change in the surface refractive power) suffices for reducing the astigmatism. The "addition", however, is an additional refractive power that is necessary when viewing a near place. Thus, if reducing the "addition", the essential object of a progressive power multifocal lens cannot be achieved. Further, if the far vision power measuring position F is not changed but the near vision power measuring position N is changed downwardly in order to increase the distance between the far vision power measuring position F and the near vision power measuring position N, the visual line of a wearer should be turned downwardly. This is inconvenient for wearers or users.

A progressive power multifocal lens, by which the astigmatism is reduced at the expense of a far vision field by attaching importance to the intermediate vision and the near vision, has been proposed in Japanese Patent Unexamined Publication No. 62-10617, as an attempt made to alleviate a sense of incongruity as much as possible, thereby improving the feeling of a user when he wears the lens. In the case of this proposed progressive power multifocal lens, the length of a progressive power zone, along which the refractive power changes progressively, is set in such a manner as to be 20 mm or more.

However, the progressive power multifocal lens disclosed in Japanese Patent Unexamined Publication No. 62-10617 was designed by attributing importance to the intermediate vision and the near vision. Thus, the lateral width of the distinct far vision viewing zone, in which the surface astigmatism is not more than 0.50 diopter (D), is only 30 mm or less. Consequently, this conventional progressive power multifocal lens still has a drawback in that when a wearer thereof views a distant place blankly, he is liable to have a keen "feeling that a visual field is narrowed".

The present invention is accomplished to eliminate such a drawback of the conventional progressive power multifocal lens.

It is, accordingly, an object of the present invention to provide a progressive power multifocal lens that has a well-balanced field of vision which is little varied or fluctuated, especially, in the transverse direction.

SUMMARY OF THE INVENTION

To achieve the foregoing object, in accordance with the present invention, there is provided a progressive power multifocal lens (hereunder sometimes referred to as a first progressive power multifocal lens), whose far vision power measuring position F, near vision power measuring position N and eye-point position E, through which a visual line of a person wearing the lens runs when his eyes are in a frontal vision condition (namely, a front viewing condition), are preliminarily set. Further, in the case that the additional surface refractive power between the surface refractive powers respectively obtained at the near vision power measuring position N and at the far vision power measuring position F is equal to the addition (Di), the lens satisfies the following conditions:

(A) The additional surface refractive power at the eye-point position E is not less than 30% and not more than 50% of the addition (Di).

(B) The lens has no axis of symmetry that bisects the entire surface thereof. Further, the lens for the right eye has a refracting surface which is different from that of the lens for the left eye.

(C) In order to adapt both cases of the lens for the right eye of a wearer and the lens for left eye thereof to the convergence action of the eyes thereof when viewing a near place, the eye-point position E is located closer to the nose thereof than the far vision power measuring position F and moreover, the near vision power measuring position N is further situated closer to the nose thereof than the eye-point position E.

(D) The far vision power measuring position F is upwardly deviated from the eye-point position E by a distance of 10 to 17 millimeters (mm). Further, the near vision power measuring position N is downwardly deviated from the eye-point position E by a distance of 14 to 21 mm.

(E) Assuming that the far vision power measuring position F on the lens is selected as a center (namely, a pole or an origin) and that a direction, in which a horizontal (half-)line extends rightwardly from the far vision power measuring position F, is determined as a reference direction whose azimuth angle is 0 (degree), a nearly sectorial domain corresponding to azimuth angles of 30 to 150 degrees is used as a far viewing distinct vision zone in which the astigmatism (namely, the astigmatic difference) is not more than 0.5 diopters irrespective of the value of the addition (Di).

In the case of a fractical embodiment (hereunder sometimes referred to as a second progressive power multifocal lens) of the first progressive power multifocal lens, let a principal fixation line (incidentally, in this specification, the term "principal fixation line" implies a curved principal fixation line) be a single curve connecting the aforementioned three points (namely, the far vision power measuring position F, the eye-point position E and the near vision power measuring position N), the horizontal deviation H of an arbitrary point P on the principal fixation line toward the nose of a wearer relative to the far vision power measuring position F is given by:

$$H = K \cdot Dp / Di$$

where K designates an arbitrary constant satisfying the following inequality relation: $1.0 \leq K \leq 4.0$; Dp an additional surface refractive power at the point P; and Di an addition.

In the case of a practical embodiment (hereunder sometimes referred to as a third progressive power multifocal lens) of the second progressive power multifocal lens, in a portion where the principal fixation line is not horizontally (or laterally) deviated from (namely, with respect to) the horizontal (or lateral) location of the far vision power measuring position F, a change in optical conditions along a horizontally (or transversely) sectional curve intersecting with the principal fixation line at the arbitrary point P occurs in such a manner that the optical conditions are (namely, the distribution of an optical characteristic quantity is) symmetry with respect to a plane which contains the point P and is perpendicular to the sectional curve and serves as a plane of mirror symmetry. In contrast, in another portion where the principal fixation line is horizontally (or laterally) deviated to the nose of a wearer from the horizontal (or lateral) location of the far vision power measuring position F, the change in the optical conditions along a horizontally sectional curve extending from the point P to the nose thereof is larger than the change in the optical conditions along another horizontally sectional curve extending from the point P to an ear thereof.

In the case of a practical embodiment (hereunder sometimes referred to as a fourth progressive power multifocal lens) of the first, second or third progressive power multifocal lens, the width W(Di, X) (mm) of a zone, in which the value of the addition (Di) ranges from at least 0.75 to 3.00 diopters and the value of the astigmatism along a horizontally (or laterally) sectional curve including the near vision power measuring position N is not more than X (diopter), meets the following relation:

$$(W(Da,X) > W(Db, X-Db/Da)$$

incidentally, X=1.00 diopter) if the additions (Di) of two kinds of lenses meet the inequality Da>Db where Da and Db denote the additions (Di) of two kinds A and B of lenses, respectively.

In the case of a practical embodiment (hereunder sometimes referred to as a fifth progressive power multifocal lens) of the second, third or fourth progressive power multifocal lens, an arbitrary point P on a part of the principal fixation line, which is other than the far vision power measuring position F and the near vision power measuring position N, has two different principal curvatures (namely, maximum and minimum curvatures corresponding to this point P).

With the aforementioned configuration, a progressive power multifocal tens having a well-balanced visual field, which is little varied or fluctuated, especially, in the transverse direction, can be obtained, in spite of employing a design thereof, by which importance is attached to the intermediate vision and the near vision. Hereinafter, the effects and advantages of the progressive power multifocal lenses of the present invention will be described in detail.

According to studies conducted by the inventor of the present invention and so on, in the case of ordinary progressive power multifocal lenses, the area of a distinct vision zone is distributed among the "distance portion", the "middle portion" and the "rerading (or near) portion" in such a manner that the area of a part thereof distributed to the "distance portion" is largest, though ratios among the areas of parts of the distinct vision zone respectively distributed to these portions somewhat vary with the kinds of the ordinary progressive power multifocal lenses. This is because the ordinary progressive power multifocal lenses are adapted to deal with the fact that the frequency of using the far (or distance) vision in daily life is extremely high. Further, the sensitivity of human eyes to astigmatism is tend to become at the maximum when using the distance vision, and is apt to decrease as the vision to be used is changed from the distance vision to the near vision through the middle vision.

A result of a wearing test independently conducted by the inventor of the present invention reveals that in the case of the far (or distance) vision, the astigmatism should be less than or equal to about 0.75 diopters for obtaining a distinct vision zone and that in the case of the near vision, the distinct vision zone can be obtained if the astigmatism is within a range of about 0.75 diopters to 1.00 diopter. It therefore, judged as being unreasonable to make a simple comparison between the areas of the distinct vision zones obtained by using a certain constant value of the astigmatism in the cases of the far vision and the distinct vision zone, respectively.

Moreover, the narrowing of the far field of vision of a person (namely, a wearer) by spectacle lenses (or eyeglasses) has a serious bad effect on his mind. This is not merely a problem of "whether or not he feels inconvenience". Namely, the oppressive feeling due to such "narrowing of the far field of vision" becomes a main cause to make a wearer avoid wearing the spectacles.

In view of such conditions, the distinct vision zone of the present invention in the case of using the far vision is defined as a domain which is nearly sectorial and largely widens upwardly toward the end thereof corresponding to azimuth angles of 30 to 150 degrees with respect to the position F. Further, in the distinct vision zone of the present invention in the case of using the far vision, the values of the astigmatism are limited to those which are less than or equal to 0.50 diopters, independently of the value of the addition (Di). The reason why the limit to the astigmatism is determined regardless of the value of the addition (Di) is that according to the result of the test independently conducted by the inventor of the present invention, there is no correlation between the limitation of (the amount of) the astigmatism in the distinct vision zone of the present invention in the case of using the far vision and the addition (Di).

Further, the reason for defining the shape of the distinct vision zone in the case of using the far vision as "a nearly sectorial domain which largely widens upwardly toward the end thereof" is to prevent the wearer from having a "feeling that a visual field is narrowed".

Moreover, in order to put the eye-point position E, through which the visual line of a wearer wearing progressive power multifocal lenses of the present invention runs when his eyes are in a frontal vision condition (namely, in a front viewing condition), into a state suitable for viewing a middle-distance place, the power multifocal lenses of the present invention are formed in such a manner that the additional surface refractive power at the eye-point position E is not less than 30% and not more than 50% of the addition (Di). This is because the results of many wearing tests have revealed that if less than 30% of the addition (Di), the surface refractive power largely changes in the portion between the far vision power measuring position F and the near vision power measuring position N and thus the astigmatism in the side portions of an intermediate visual field cannot be sufficiently reduced and that if exceeds 50% of the addition (Di), the distinct vision zone in the case of using the far vision cannot be ensured sufficiently.

Furthermore, in the case of the progressive power multifocal lens, the astigmatism is decreased more satisfactorily in comparison with the ordinary progressive power multifocal lenses. Thus, it is necessary to improve the binocular vision in the side portions of the visual field. Accordingly, what is called a "design of the laterally symmetric type", by which each of the lens has an axis of symmetry bisecting the entire surface thereof and each of the lenses is rotated around the axis of symmetry by an angle of 5 to 10 degrees when fitted into the eyeglass frames, is not desirable because such a design is made without considering the binocular vision in the side portions of the visual field. Consequently, what is called a "design of the laterally asymmetric type", by which the refractive surface of the lens for the right eye is different from that of the lens for the left eye, is best-suited for the progressive power multifocal lens of the present invention.

Further, as to the horizontal placement of the far vision power measuring position F, the eye-point position E and the near vision power measuring position N, in order to adapt both cases of the lens for the right eye of a wearer and the lens for the left eye thereof to the convergence action of the eyes thereof when viewing a near place, it is necessary that the eye-point position E is located closer to the nose thereof than the far vision power measuring position F and that moreover, the near vision power measuring position N is further situated closer to the nose thereof than the eye-point position E.

Moreover, as to the longitudinal placement of these three positions, preferably, the far vision power measuring position F is upwardly deviated from the eye-point position E by a distance of 10 to 17 (more preferably, 12 to 15) millimeters (mm). Further, desirably, the near vision power measuring position N is downwardly deviated from the eye-point position E by a distance of 14 to 21 (more desirably, 16 to 19) mm. The results of many wearing tests have revealed that these ranges of the positions F and N are most suitable for simultaneously realizing both of the reduction in the refractive power, which is caused by ensuring the sufficient distance between the positions F and N, and the smooth movement of visual lines to the two zones, namely, the distance portion and the near portion.

Meanwhile, as above described, a single curve including three points, namely, the far vision power measuring position F, the eye-point position E and the near vision power measuring position N is assumed. Further, this curve is named a "principal fixation line" because of the fact that when a wearer fixes his eyes on an object, visual lines runs through this curve with the highest frequency. For the purpose of making the progressive power multifocal lenses of the present invention further easier (or more convenient) to use, the position of the principal fixation line on each of the lenses is determined by obtaining the horizontal deviation H of an arbitrary point P on the principal fixation line toward the nose of the wearer relative to the far vision power measuring position F from the following equation:

$$H = K \cdot Dp/Di$$

where K designates an arbitrary constant satisfying the following inequality relation: $1.0 \leq K \leq 4.0$; Dp an additional surface refractive power at the point P: and Di the addition.

Incidentally, the reason for increasing the additional surface refraction power along the principal fixation line is to see a nearer object. Further, when viewing a nearer object, each of the visual lines of the left and right eyes comes nearer to the nose of a wearer (namely, the convergence action of his eyes is enhanced). It is, thus, necessary for meeting the convergence action to increase the deviation of the principal fixation line toward his nose. Consequently, the horizontal deviation H of an arbitrary point P on the principal fixation line is proportional to the value obtained by dividing the additional surface refractive power Dp by the addition Di. Additionally, the reason for allowing the value of the arbitrary constant K to have a permissible range is that when running through the lens, the visual line is refracted by the prism action (or effects) of the horizontal component of the transmission refractive power of the lens at the position thereof corresponding to the deviation H, and that thus, when the transmission refractive power is negative, the value of the constant K decreases, and in contrast, when the transmission refractive power is positive, the value of the constant K increases. In the case that the transmission refractive power is 0, the value of the constant K is preferably 2.5 or so.

Moreover, the progressive power multifocal lenses of the present invention can be further improved by applying the following techniques to the contents of the aforementioned "design of the laterally asymmetric type" so as to make these lenses more convenient to use. Namely, it is necessary for obtaining binocular vision to use a lens for the right eye of a wearer and a lens for the left eye thereof, which are matched with each other in the following respects of: the astigmatism in the case of the lenses through which the visual lines of the wearer run; the direction of what is called the axis of the astigmatism; what is called the average power of the lens (namely, the arithmetic mean of what is called the spherical power (or diopter) thereof and what is called the astigmatic power (namely, the cylindrical diopter) thereof); the horizontal component of the prism refractive power (namely, the prism diopter) thereof; and the vertical component of the prism diopter thereof. Here, note that in the case where an object to be viewed is placed in front of the wearer, it is enough for such improvement of the progressive power multifocal lenses to take only the placement of the aforementioned principal and the distribution of the surface refractive power into consideration.

However, when the object to be viewed moves to the side of the wearer, the visual line of one of his eyes moves to his ear, whereas that of the other eye moves to his nose. Thus, the lenses, through which the visual lines of his left and right eyes run, respectively, are not always in the same optical conditions.

If the object to be viewed is in the infinite distance from the wearer, the deviation angles of the visual lines of his left and right eyes at the time of changing the viewing condition from the front viewing condition to the side (or periphery) viewing condition are equal to each other. It is, therefore, preferable that the optical conditions on the lenses are (namely, the distribution of an optical characteristic quantity on the lens is) symmetry with respect to a plane which contains the aforementioned principal fixation line and is perpendicular to the sectional curve (for example, to the horizontal direction) and serves as a plane of mirror symmetry (incidentally, this distribution of the optical characteristic quantity on two lateral halves of the lens are not simply symmetric with (an arbitrary point on) the principal fixation line but are symmetrical with respect to the plane of mirror symmetry as seen by putting a mirror on the principal fixation line or curve including the arbitrary point P (additionally, the reason for employing such a symmetric distribution is that the "optical characteristic properties" include directional properties such as a change in the direction of what is called the axis of the astigmatism (or astigmatic difference)).

In contrast, if the object to be viewed is in the finite distance from the wearer, the visual lines of his left and right eyes go nearer to his nose by the convergence action of his eyes, respectively. When changing the viewing condition from the front viewing condition to the side (or periphery) viewing condition during his eyes are in this state, the deviation angles of the visual lines of his left and right eyes are equal to each other if the distance between the object and the wearer (namely, his eyes) is invariant. However, as can be readily understood by considering, for example, the case where the object is in the immediate vicinity of the wearer, the distance therebetween usually increases when changing the viewing condition from the front viewing condition to the side viewing condition. As a result, the convergence action of his eyes becomes weak and the visual lines of his eyes become nearly parallel.

Thus, if the object to be viewed is in the finite distance from the wearer, the deviation angles of the visual lines of his left and right eyes are different from each other upon changing the viewing condition from the front viewing condition to the side viewing condition. Namely, the angular deviation of the visual line moving to his ear is larger than that of the visual line moving to his nose. In the case of the spectacle lenses turning together with the head of a wearer, this tendency is further increased or enhanced owing to the turn of his head in the side viewing condition (incidentally, the head turns nearly a half of an angle required to change the viewing condition from the front viewing condition to the side viewing condition and moreover, his eyeballs turn by the remaining part of such an angle, and thus this tendency becomes noticeable. Consequently, it is preferable for viewing an object placed in the finite distance from a wearer that the optical conditions on a portion, in which the corresponding part of the principal fixation line is deviated toward his nose, of each lens are laterally asymmetric with a plane, which includes an arbitrary point on the principal fixation line, in the lateral (or horizontal) direction.

In the case of the progressive power multifocal lenses, the optical conditions (namely, the distributions of the optical characteristic properties) in the lateral (or horizontal) direction of an arbitrary point on the principal fixation line thereof changes usually. It is, therefore, preferable for realizing same (or similar) optical conditions (namely, the symmetric distribution of the optical characteristic property) on the two lateral half parts of the lens, through which the visual line passes, the change in the optical conditions along a horizontally sectional curve extending from the arbitrary point P to the nose thereof is larger than that in the optical conditions along another horizontally (or laterally) sectional curve extending from the point P to an ear thereof.

In summary, it is preferable that in a portion where the principal fixation line is not horizontally (or laterally) deviated from (namely, with respect to) the horizontal (or lateral) location of the far vision power measuring position F, a change in optical conditions (at least one of a change in the astigmatism along the horizontally (or laterally) sectional curve intersecting with the principal fixation line at an arbitrary point P on the principal fixation line, a change in the direction of what is called the axis of the astigmatism, a change in the average power thereof, a change in the horizontal component of the prism diopter (or refractive power) thereof and the vertical component of the prism diopter thereof) occurs symmetrically with respect to a plane which includes the point P and is perpendicular to the sectional curve and serves as a plane of mirror symmetry. Moreover, it is desirable that in another portion where the principal fixation line is horizontally (or laterally) deviated to the nose of a wearer from the horizontal (or lateral) location of the far vision power measuring position F, the change in the optical conditions along a horizontally (or laterally) sectional curve extending from the point P to the nose thereof is larger than that in the optical conditions along another horizontally (or laterally) sectional curve extending from the point P to an ear thereof.

Furthermore, in view of the fact that progressive power lenses having large additions (Di) become necessary with advancing age, the countermeasures against problems occurring in the case of large additions (Di) are studied in order to make the progressive power multifocal lens of the present invention more convenient to use.

Namely, those who wear spectacle lenses having relatively small additions (Di) are relatively young and thus lead active visual lives. Such wearers, accordingly, require the stability of a (dynamic) visual field at the time of moving their heads and visual lines largely. Conversely, those who wear spectacle lenses having relatively large additions (Di) are of relatively advanced age and thus lead inactive visual lines. Such a wearer, therefore, requires the stability of a (static) visual field at the time when they do not move his head and visual lines so largely. Consequently, it is preferable that the contents of the design, namely, the distributions of the astigmatism of the progressive power multifocal lens, the astigmatic (difference) in the direction of the optical axis thereof, the average power thereof (namely, the arithmetic mean of the spherical power (or diopter) thereof and the astigmatic power (namely, the cylindrical diopter) thereof), the horizontal component of the prism refractive power (namely, the prism diopter) thereof and the vertical component of the prism diopter thereof are changed in such a manner as to meet the aforementioned requirements.

Moreover, the result of the test independently conducted by the inventor of the present invention have revealed that there is little correlation between the limitation astigmatism in the distinct vision zone of the present invention in the case of using the far vision and the addition (Di) and that a distinct vision can be obtained or achieved if the astigmatism is within a range of about 0.75 diopters to 1.00 diopter. Thus, if the same design is employed correspondingly to any value of the addition (Di) similarly as in the conventional manner, the distinct vision zone in the case of using the near vision inevitably has a tendency to narrow when the addition (Di) is large. Such a tendency, however, can be decreased if the design is changed in such a way that as the addition (Di) is increased, the width W of the astigmatism, which is less than about 1.00 diopters, is increased so as to widen the distinct vision zone in the case of the near vision.

In summary, the tendency of the distinct vision zone, which is obtained by using the near vision, to narrow in the case of the large addition (Di) can be weakened if the width W(Di, X) (mm) of a zone, in which the value of the addition (Di) ranges from 0.25 to 5.00 (at least 0.75 to 3.00) diopters and the value of the astigmatism along a horizontally (or laterally) sectional curve including the near vision power measuring position N is not more than X (diopter), meets the following relation:

$$W(Da, X) > W(Db, X \cdot Db/Da)$$

(incidentally, X=1.00 diopter) in the case that the "additions" of two kinds of lenses meet the inequality Da>Db where Da and Db denote the additions (Di) of two kinds A and B of lenses, respectively. Incidentally, when the addition (Di) becomes large, the astigmatism in the side of the near portion or zone increases if the astigmatism is decreased in the near portion. Thus the static visual field becomes more stable, while the dynamic visual fields becomes instable. Namely, if a design to stabilize the dynamic visual field is applied to the progressive power multifocal leas having a relatively small "addition" and the aforementioned method is applied to the progressive power multifocal lens having relatively large "addition", the static visual field of the progressive power multifocal lens having a relatively large "addition" becomes stable becomes and the aforesaid requirements can be simultaneously satisfied.

The examples of the optical conditions (or characteristic properties) cited hereinabove are the astigmatism of the progressive power multifocal lens, the direction of what is called the axis of the astigmatism, the average power thereof (namely, the arithmetic mean of the spherical power (or diopter) thereof and the astigmatic power (namely, the cylindrical diopter) thereof), the horizontal component of the prism refractive power (namely, the prism diopter) thereof and the vertical component of the prism diopter thereof. These properties or conditions are treated mainly as those of the surface (portion) of the progressive power multifocal lens, for brevity of description. Namely, the term "astigmatism" used hereinabove means (or designates) the surface astigmatism of a progressive-power surface portion of a progressive power multifocal lens. Further, the "average power" used hereinbefore indicates the surface average power of the progressive-power surface portion thereof, Additionally, the "prism refractive power" is relatively simply calculated or estimated from data representing the difference between normals to the top (or front) progressive-power surface and the back surface of the progressive power multifocal lens and so forth.

Actual lenses, however, are first fitted into an eyeglass frame or rim. Then, the eyeglass lenses are worn by a wearer in such a manner that each of the lenses is at a distance of about 12 mm forwardly away from the corresponding eye of the wearer and is bent forwardly from the vertical direction at an angle of 5 to 10 degrees. It is, therefore, obvious that an angel formed between a visual line and the lens, the thickness of a part, which intersects with the visual line, of the lens (strictly speaking, the optical path length of the visual line within the lens) and so on relate to one another. Thus, even in the case when it is considered that the aforesaid "astigmatism" is transmission astigmatism, that the "average power" is transmission average power and that the "prism refractive power" should be calculated from the deviation angles of visual lines (incidentally, concerning only the "addition", the "additional surface refractive power" is especially used because it is the essential definition of the "addition" (Di) used in the art), the progressive power multifocal lenses having the aforementioned configurations are within the scope of the present invention. Additionally, the conventional definition (namely, "a curve on which no surface astigmatism occurs (namely, what is called "a navel-like meridional curve")) of the "principal fixation line" is not used herein, because of the facts that the condition, in which the lens has no surface stigmatism, is not the best mode in an actual situation, in which the lens is used, and that thus, such a condition is not indispensable for the progressive power multifocal lens of the present invention.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1 is a diagram for illustrating the layout (namely, the arrangement of various optical information measuring points) of a progressive power multifocal lens of the present invention for the right eye of a wearer, namely, Embodiment 1 of the present invention;

DETAILED DESCRIPTION OF THE PREFERRED EMBODIMENTS

Hereinafter, the preferred embodiments of the present invention will be described in detail by referring to the accompanying drawings.

Embodiment 1

FIG. 1 is a diagram for illustrating the layout (namely, the arrangement of various optical information measuring points) of a progressive power multifocal lens for the right eye of a wearer, namely, Embodiment 1 of the present invention As shown in FIG. 1 (in a manner slightly exaggerated for the purpose of illustration), the far vision power measuring position F is located at a distance of 14 mm upwardly away from the geometrical center of this lens. Moreover, the near vision power measuring position N is located at a point which is 17.5 mm downwardly away from the geometrical center of this lens and further is 2.5 mm rightwardly away therefrom (namely, inwardly to the nose of the wearer therefrom). Furthermore, the position E, through which a visual line run when the wearer looks to the front thereof (namely, is in the front viewing condition), is 1.0 mm rightwardly (namely, horizontally to the nose of the wearer) away from the geometrical center of this lens.

In the case of this embodiment, the refractive power in the case of using the far vision is S−1.00 diopter and the addition (Di) is +2.00 diopters. The additional surface refractive power at the far vision power measuring position F is +0.76 diopters, which corresponds to about 38% of the addition (Di). Assuming that the direction, in which a horizontal (half-)line extends rightwardly from the far vision power measuring position F on this lens, as viewed in this figure, is determined as the reference direction whose azimuth angle is 0 (degree), the nearly sectorial domain Df corresponding to azimuth angles of 30 to 150 degrees is used as the far viewing distinct vision zone in which the astigmatism is not more than 0.5 diopters.

A single thick curve extending from top to bottom in a nearly central portion of this lens, as viewed in FIG. 1, is the principal fixation line that runs through the far vision power measuring position F, the eye-point position E and the near vision power measuring position N. Thus, this single thick curve divides the surface of this lens into a nose-side part and an ear-side part, which are asymmetric in the horizontal (or lateral) direction.

Figure 2:
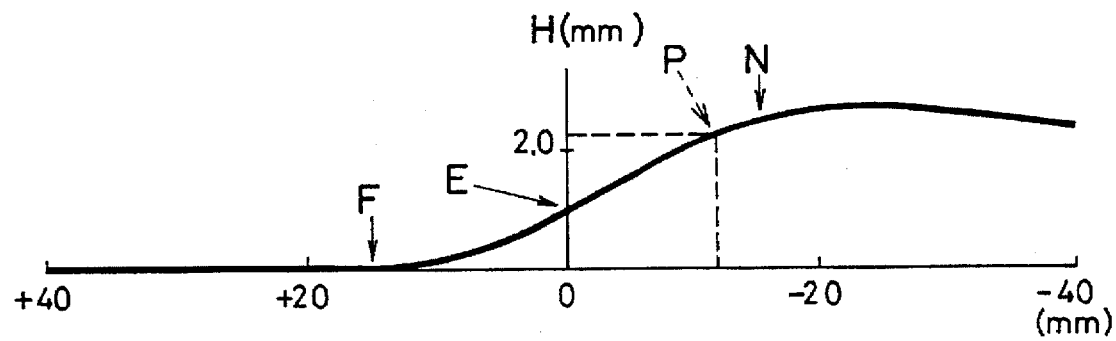
FIG. 2 is a graph for showing the deviation H at an arbitrary point P on the principal fixation line of the progressive power multifocal lens for the right eye of FIG. 1, namely, Embodiment 1 of the present invention.
Figure 3:
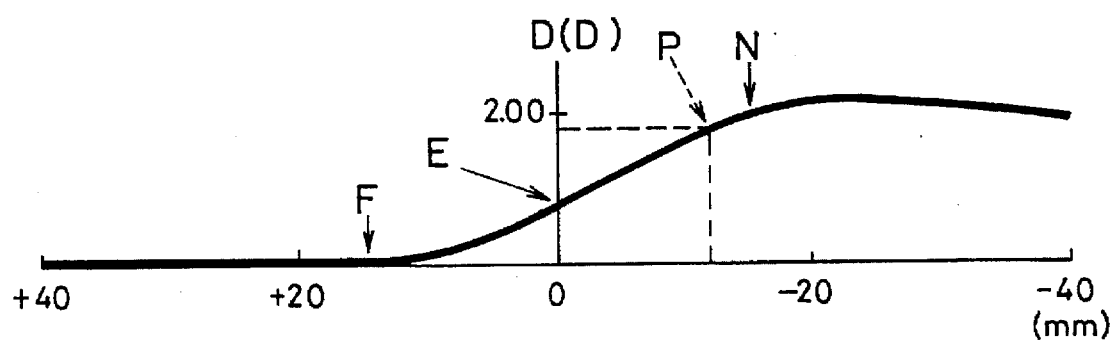
FIG. 3 is a graph for showing the additional surface refractive power D at the arbitrary point P on the principal fixation line of the progressive power multifocal lens for the right eye of FIG. 1, namely, Embodiment 1 of the present invention.

The deviation H at an arbitrary point P on this principal fixation line is shown in FIG. 2. Further, the additional surface refractive power D at the arbitrary point P on this principal fixation line is shown in FIG. 3. In FIGS. 2 and 3, positive abscissas represent positions located upwardly away from the geometrical center of this lens, whereas negative abscissas represent positions located downwardly away from the geometrical center thereof. A glance at FIGS. 2 and 3 shows that the graphs of these figures resemble in shape and differ from each other only in the ordinates. This is because of the fact that there is the relation between the deviation H and the additional surface refractive power D, which is expressed by the following equation:

$$H = K \cdot D/Di$$

where K is a constant which is 2.5 in this case.

Embodiment 2

Figure 4:
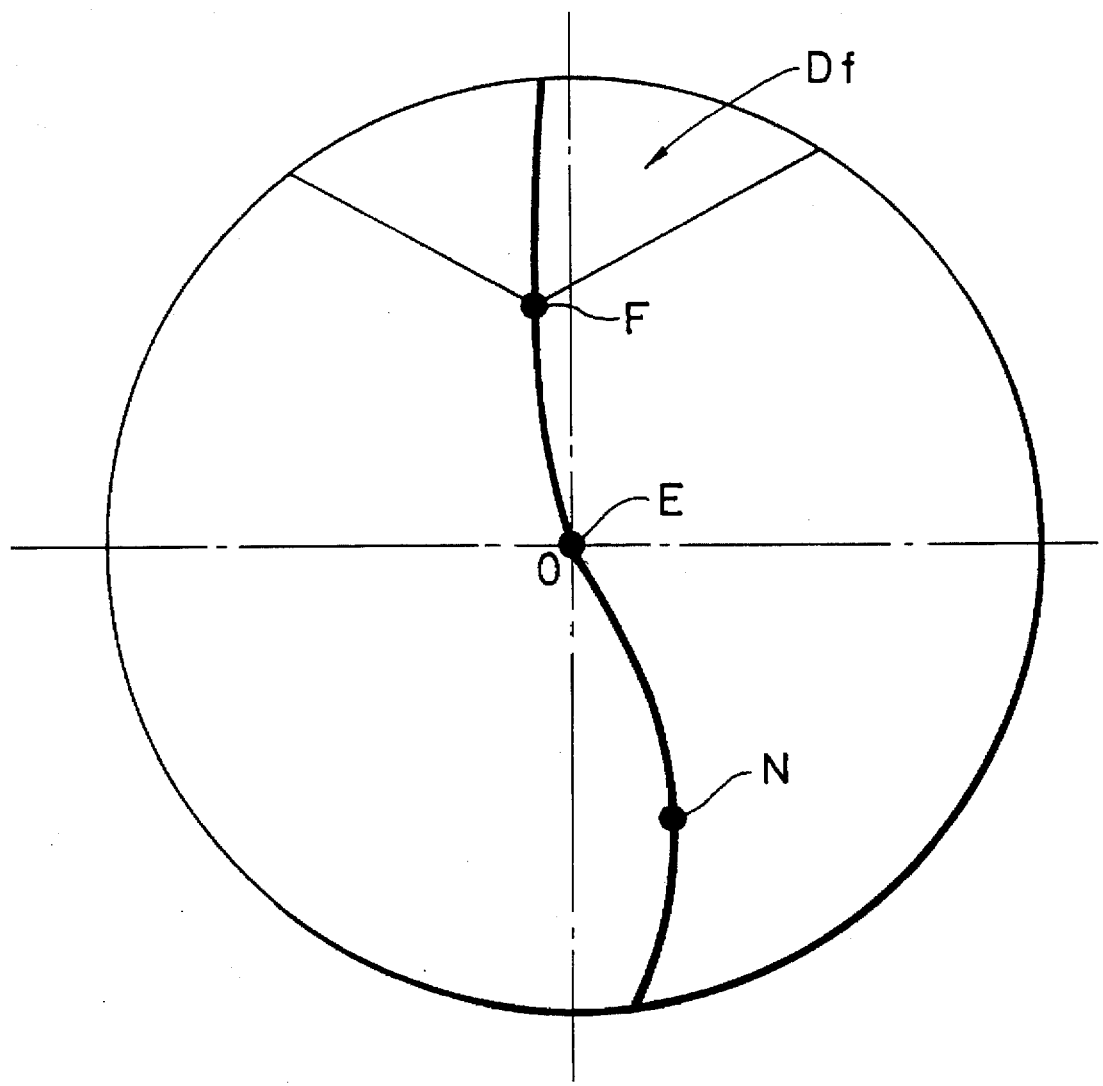
FIG. 4 is a diagram for illustrating the layout (namely, the arrangement of various optical information measuring points) of another progressive power multifocal lens of the present invention for the right eye of a wearer, namely, Embodiment 2 of the present invention.

FIG. 4 is a diagram for illustrating the layout (namely, the arrangement or various optical information measuring points) of another progressive power multifocal lens of the present invention for the right eye of a wearer, namely, Embodiment 2 of the present invention.

As shown in FIG. 4, the far vision power measuring position F is located at a point which is 14 mm upwardly away from the geometrical center of this lens and further is 1.0 mm leftwardly away therefrom (namely, to an ear of the wearer therefrom). Moreover, the near vision power measuring position N is located at a point which is 17.5 mm downwardly away from the geometrical center of this lens and further is 1.5 mm rightwardly away therefrom (,tamely, inwardly to the nose of the wearer therefrom). Furthermore, the position E, through which a visual line run when the wearer looks to the front thereof (namely, is in the front viewing condition), is located at the geometrical center of this lens.

The far vision power measuring position F, the eye-point position E and the near vision power measuring position N of this embodiment are obtained by horizontally (laterally) shifting or deviating the corresponding positions F, E and N of FIG, 1 to the ear of the wearer by a distance of 1.0 mm, respectively. In the other respects, this progressive power multifocal lens of this embodiment is similar to that of Embodiment 1.

The lens of this Embodiment 2 has an advantage over that of Embodiment 1 in that the eye-point position E can be easily made to coincide with the central point in processing the back surface and also used as a prism-refractive-power measuring point.

Embodiment 3

Figure 5:
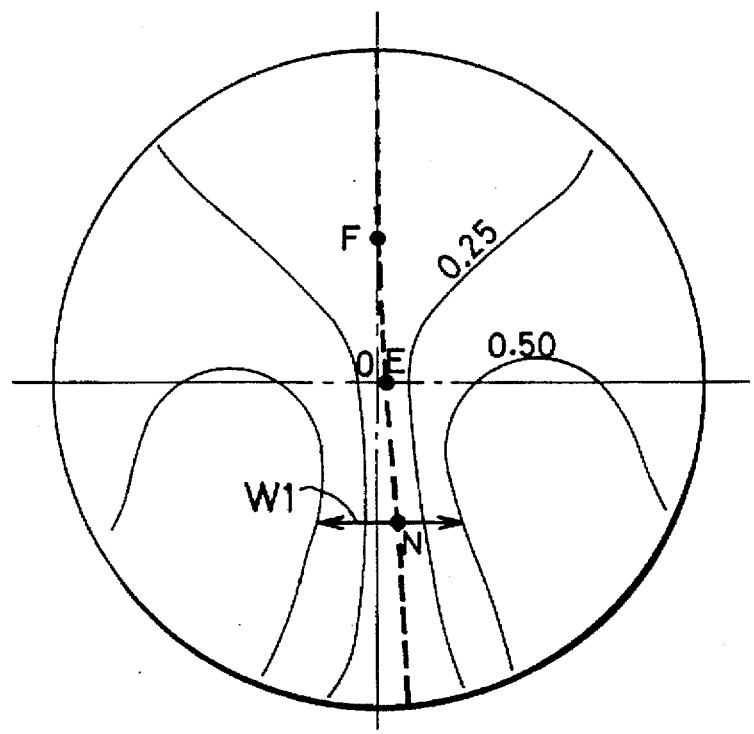
FIG. 5 is a diagram for illustrating a distribution of astigmatism in the case of still another progressive power multifocal lens of the present invention for the right eye of a wearer, namely, Embodiment 3 of the present inventions.
Figure 6:
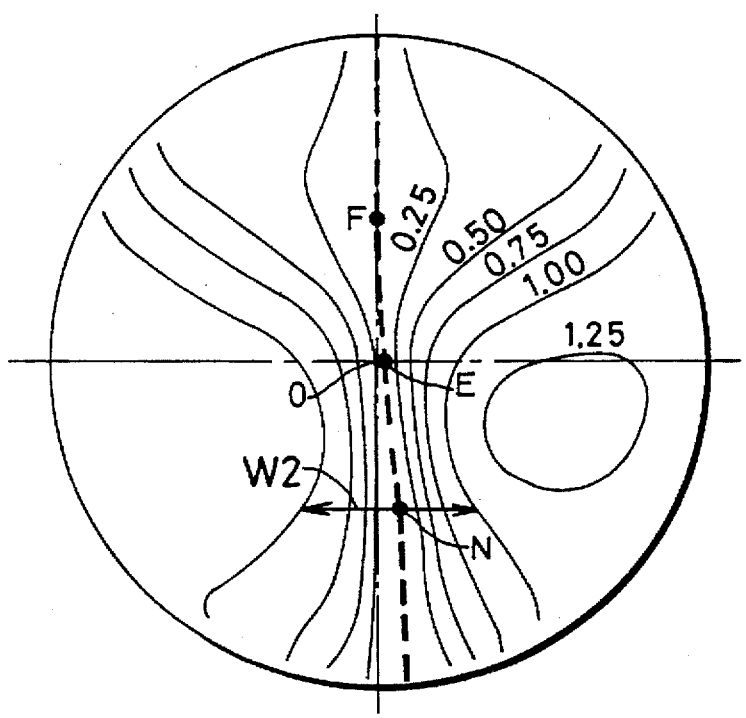
FIG. 6 is a diagram for illustrating another distribution of astigmatism in the case of the progressive power multifocal lens for the right eye, namely, Embodiment 3 of the present invention.

FIGS. 5 and 6 are diagrams that illustrate the distributions of astigmatism in the case of still another progressive power multifocal lens of the present invention for the right eye of a wearer, namely, Embodiment 3 of the present invention. Here, note that FIG. 5 corresponds to the case where the progressive power multifocal lens of this embodiment has the "addition" Da of +1.00 diopter, that FIG. 6 corresponds to the case that the progressive power multifocal lens of this embodiment has the "addition" Db of +2.00 diopters, that the solid curves of each of these figures are "contour lines" respectively corresponding to the values of astigmatism, which are determined at intervals of 0.25 diopters, and that a numerical value written at the side of each of these solid curves represents the astigmatism, namely, the astigmatic difference (in diopters).

The placement of the far vision power measuring position F, the eye-point position E and the near vision power measuring position N of this embodiment of FIGS. 5 and 6 is the same as of the corresponding positions F, E and N of Embodiment 1. A single (dashed) curve extending from top to bottom in a nearly central portion of this lens, as viewed in each of these figures, is the principal fixation line that runs through the far vision power measuring position F, the eye-point position E and the near vision power measuring position N. Further, in a region (illustrated as being laying higher or above the far vision power measuring position F in these figures) in which the principal fixation line is not deviated in the horizontal (or lateral) direction from the far vision power measuring position F, the spacings between the contour lines are laterally symmetric with respect to a plane of mirror symmetry. Moreover, in another region (illustrated as being laying lower or below the far vision power measuring position F in these figures) in which the principal fixation line is deviated to the nose (namely, rightwardly as viewed in each of these figures) from the far vision power measuring position F, the contour lines are dense in the "nose-side part (namely, the right-side part as viewed in each of these figures) but are sparse in the "ear-side part (namely, the left-side part as viewed therein). Thus, the change in the astigmatism along the part extending from the principal fixation line to the nose of the wearer is larger than the change in the astigmatism along the part extending from the principal fixation line to the car thereof. This feature or tendency holds true not only for the astigmatism, but also for the direction of what is called the axis of the astigmatic of the lens, the average power thereof (namely, the arithmetic mean of the spherical power (or diopter) thereof and the astigmatic power (namely, the cylindrical diopter) thereof), the horizontal component of the prism refractive power (namely, the prism diopter) thereof and the vertical component of the prism diopter thereof.

Moreover, in this case, the width $W(Di, X)$ (mm) of a zone, in which the value of the astigmatism along a horizontally sectional curve including the near vision power measuring position N is not more than X (diopter), meets the following inequality relation:

$$W(Da, X) > W(Db, X \cdot Db/Da)$$

(incidentally $X=1.00$ diopter) if the "additions" of two kinds of lenses meet the inequality $Da > Db$ where $Da$ and $Db$ denote the additions (Di) of two kinds A and B of lenses, respectively.

Thus, the width W 1 of the near portion of FIG. 5 is given by:

$$W1 = W(1.00, 0.50).$$

Further, the width W2 of the near portion of FIG. 6 is given by:

$$W2 = W(2.00, 1.00).$$

Therefore, in view of the fact that the lens of FIG. 5 has the addition (Di) which is twice the addition (Di) that the lens of FIG. 6 has, the lens of FIG. 6 should be equivalent to a set of two lenses of FIG. 5 if the lenses of FIGS. 5 and 6 are fabricated with the same design rules. Namely, the width W2 corresponding to the astigmatism (or astigmatic difference) of 1.00 diopter in the case of the "addition" Db of +2.00 diopters should be equal to the width W1 corresponding to the astigmatism of 0.50 diopters in the case of the "addition" Da of +1.00 diopter.

However, as can be easily seen from the comparison between the widths of two arrows W1 and W2 running through the positions N of FIGS. 5 and 6, the width W2 is greater than the width W1. Namely, the following inequality holds for this case:

$$W(2.00, 1.00) > W(1.00, 0.50).$$

This reveals that the design employed by this embodiment of the present invention decreases the tendency of the distinct vision zone, which is obtained by using the near vision, to narrow when the addition (Di) becomes large.

Embodiment 4

Figure 7:
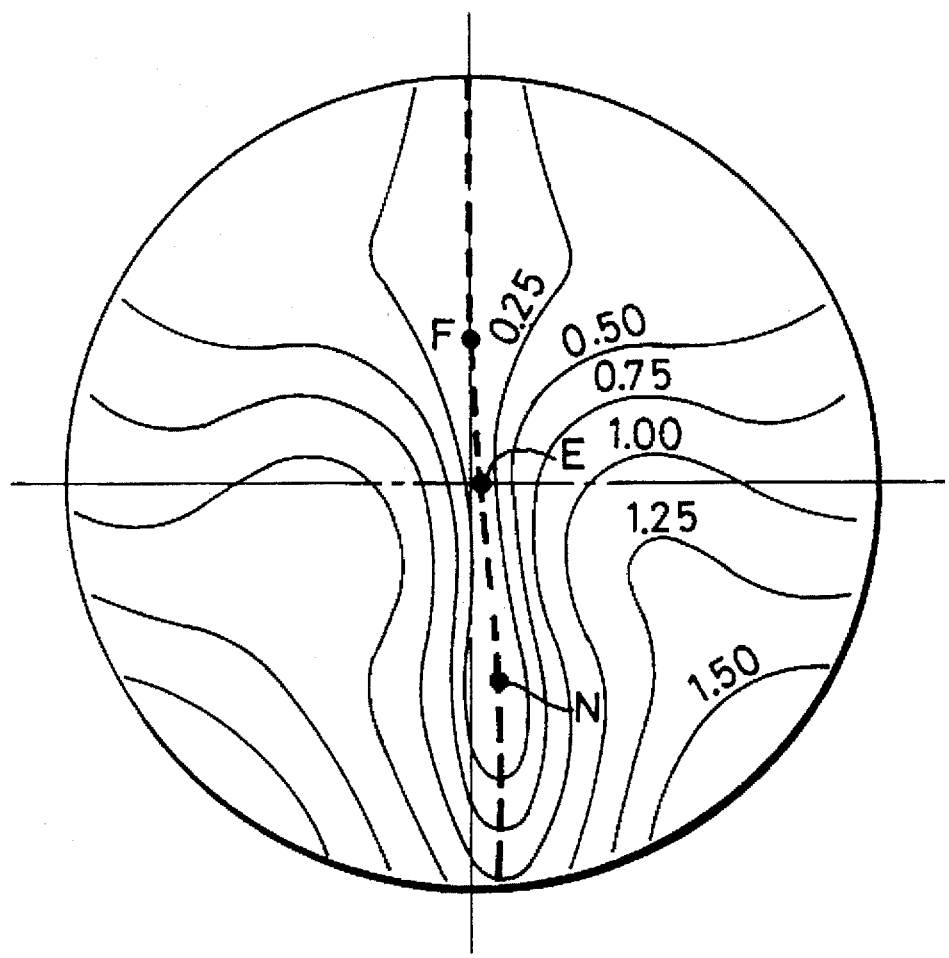
FIG. 7 is a diagram for illustrating a distribution of astigmatism in the case of yet another progressive power multifocal lens of the present invention for the right eye of a wearer, namely, Embodiment 4 of the present invention.

FIG. 7 is a diagram for illustrating a distribution of astigmatism in the case of yet another progressive power multifocal lens of the present invention for the right eye of a wearer, namely, Embodiment 4 of the present invention. In the case of this embodiment, the refractive power when using the far vision is S+1.50 diopters and the addition (Di) is 2.00 diopters. Further, the (solid) curves of this figure are contour lines respectively corresponding to the values of astigmatism, which are determined at intervals of 0.25 diopters, incidentally, a numerical value described at the side of each of these solid curves represents the astigmatism (in diopters).

As shown in this figure, the far vision power measuring position F is located at a distance of 15 mm upwardly away from the geometrical center O of the lens. Moreover, the near vision power measuring position N is located at a point which is 19 mm downwardly away from the geometrical center O of the lens and further is 1.0 mm rightwardly away therefrom (namely, inwardly to the nose of a wearer therefrom). Furthermore, the position E, through which a visual line run when the wearer looks to the front thereof (namely, is in the front viewing condition), is 1.0 mm rightwardly (namely, horizontally to the nose of the wearer) away from the geometrical center O of this lens. A single (dashed) curve extending from top to bottom in the nearly central portion of the lens, as viewed in this figure, is the principal fixation line that runs through the far vision power measuring position F, the eye-point position E and the near vision power measuring position N. A lower part of this principal fixation line intersects with the contour lines. This shows that in the lower portion of the lens, there is a part, each point along which has two different principal curvatures, of the principal fixation line.

In the case of this embodiment, on the assumption that the eyeglass lenses are worn by a wearer in such a manner as to be at a distance of about 12 mm forwardly away from the corresponding eye of the wearer and to be bent forwardly from the vertical direction at an angle of 7 degrees, the surface (portion) of each of the lenses is set by taking, the angel, at which the visual line intersects with the surface of the lens, the optical path length of the visual line within the lens and so on into consideration correspondingly to all of the directions of the visual lines in such a way that the distributions of the transmission astigmatism, the transmission average refractive power and the deviation angle of the visual line become more desirable. However, only in the case of the positions F and N, the two principal curvatures are set in such a manner as to be equal to each other, for convenience of inspection.

As above described in detail, the progressive power multifocal lens of the present invention is established in such a way as to satisfy the following conditions:

(A) The additional surface refractive power at the eye-point position E is not less than 30% and not more than 50% of the addition (Di).

(B) The lens has no axis of symmetry that bisects the entire surface thereof. Further, the lens for the right eye has a refracting surface which is different from that of the lens for the left eye.

(C) In order to adapt both cases of the lens for the right eye of a wearer and the lens for the left eye thereof to the convergence action of the eyes thereof when viewing a near place, the eye-point position E is located closer to the nose thereof than the far vision power measuring position F and moreover, the near vision power measuring position N is further situated closer to the nose thereof than the eye-point position E.

(D) The far vision power measuring position F is upwardly deviated from the eye-point position E by a distance of 10 to 17 mm. Further, the near vision power measuring position N is downwardly deviated from the eye-point position E by a distance of 14 to 21 mm.

(E) Assuming that the far vision power measuring position F on the lens is selected as a center and that rightwardly a direction, in which a horizontal (half-)line extends from the far vision power measuring position F, is determined as a reference direction whose azimuth angle is 0 (degree), a nearly sectorial domain corresponding to azimuth angles of 30 to 150 degrees is used as a far viewing distinct vision zone in which the astigmatism is not more than 0.5 diopters irrespective of the value of the addition (Di).

Consequently, the progressive power multifocal lens of the present invention has an excellent viewing function in the respects of the intermediate vision and the near vision, and further has a well-balanced viewing zone among the distance, near and middle portions, whereby a resultant image of an object is little varied or fluctuated, especially, in the lateral (or transverse) direction.

Although the preferred embodiments of the present invention have been described above, it should be understood that the present invention is not limited thereto and that other modifications will be apparent to those skilled in in the art without departing from the spirit of the invention.

The scope of the present invention, therefore, should be determined solely by the appended claims.

What is claimed is:

1. A progressive power multifocal lens having a far vision power measuring position, a near vision power measuring position and an eye-point position, through which a visual line runs when being in a front viewing condition, which are preliminarily located, wherein an additional surface refractive power between surface refractive powers respectively obtained at the near vision power measuring position and at the far vision power measuring position is equal to an addition, wherein the progressive power multifocal lens satisfies the following conditions:

(a) the additional surface refractive power at the eye-point position is not less than 30% and not more than 50% of the addition;

(b) the lens has no axis of symmetry that bisects an entire surface thereof, and the lens for the right eye has a refracting surface which is different from a refracting surface of the lens for the left eye;

(c) the eye-point position is located closer to a nose than the far vision power measuring position: and the near vision power measuring position is further situated closer to the nose thereof than the eye-point position in such a manner that both cases of the lens for the right eye and the lens for the left eye are adapted to a convergence action of the eyes when viewing a near place;

(d) the far vision power measuring position is upwardly deviated from the eye-point position by a distance of 10 to 17 mm; and the near vision power measuring position is downwardly deviated from the eye-point position by a distance of 14 to 21 mm; and (e) assuming that the far vision power measuring position is used as a center and that a direction, in which a horizontal half-line extends rightwardly from the far vision power measuring position, is determined as a reference direction whose azimuth angle is 0, a nearly sectorial domain corresponding to azimuth angles of 30 to 150 degrees is used as a far viewing distinct vision zone in which astigmatism is not more than 0.5 diopters irrespective of the value of the addition.

2. The progressive power multifocal lens according to claim 1, wherein a single curve running through the far vision power measuring position, the eye-point position and the near vision power measuring position is a principal fixation line, wherein a horizontal deviation (H) of an arbitrary point (P) on the principal fixation line toward the nose relative to the far vision power measuring position is given by:

$$H = K \cdot Dp/Di$$

where K designates an arbitrary constant satisfying an inequality relation: $1.0 \geq K \geq 4.0$ Dp an additional surface refractive power at the arbitrary point (P); and Di an addition of the lens.

3. The progressive power multifocal lens according to claim 2, wherein in a portion where the principal fixation line is not horizontally deviated from the horizontal location of the far vision power measuring position, a change in optical conditions along a horizontally sectional curve intersecting with the principal fixation line at the arbitrary point (P) occurs in such a manner that the optical conditions are symmetry with respect to a plane which contains the arbitrary point (P) and is perpendicular to the sectional curve and serves as a plane of mirror symmetry, wherein in another portion where the principal fixation line is horizontally deviated to a nose from the horizontal location of the far vision power measuring position, a change in the optical conditions along a horizontally sectional curve extending from the arbitrary point (P) to the nose thereof is larger than a change in the optical conditions along another horizontally sectional curve extending from the arbitrary point (P) to an ear.

4. The progressive power multifocal lens according to claim 2, wherein a width (W(Di, X) (mm)) of a zone, in which values of the addition (Di) range from at least 0.75 to 3.00 (diopters) and a value of the astigmatism along a horizontally sectional curve including the near vision power measuring position is not more than X (diopter), meets the following relation:

$$W(Da, X) > W(Db, X \cdot Db/Da)$$

(incidentally, X=1.00 (diopter)) if the additions (Di) of two kinds of lenses meet the inequality Da>Db where Da and Db denote the additions (Di) of two kinds (A, B) of lenses, respectively.

5. The progressive power multifocal lens according to claim 2, wherein the principal fixation line having a part whose arbitrary point, which is other than the far vision power measuring position and the near vision power measuring position, has two different principal curvatures.

* * * * *